US009744500B2

(12) United States Patent
Ishihara et al.

(10) Patent No.: US 9,744,500 B2
(45) Date of Patent: Aug. 29, 2017

(54) MICROPOROUS POLYMERIC MEMBRANES, BATTERY SEPARATORS, AND PRODUCTION METHODS THEREFOR

(75) Inventors: Takeshi Ishihara, Nasushiobara (JP); Satoshi Miyaoka, Nasushiobara (JP); Koichi Kono, Nasushiobara (JP); Donna J. Crowther, Seabrook, TX (US); Patrick Brant, Seabrook, TX (US); Kazuhiro Yamada, Nasushiobara (JP)

(73) Assignee: Toray Industries, Inc. (JP)

( * ) Notice: Subject to any disclaimer, the term of this patent is extended or adjusted under 35 U.S.C. 154(b) by 1611 days.

(21) Appl. No.: 13/259,226

(22) PCT Filed: Mar. 5, 2010

(86) PCT No.: PCT/US2010/026416
§ 371 (c)(1),
(2), (4) Date: Sep. 23, 2011

(87) PCT Pub. No.: WO2010/114671
PCT Pub. Date: Oct. 7, 2010

(65) Prior Publication Data
US 2012/0028102 A1 Feb. 2, 2012

Related U.S. Application Data

(60) Provisional application No. 61/177,060, filed on May 11, 2009, provisional application No. 61/164,824, filed on Mar. 30, 2009, provisional application No. 61/164,817, filed on Mar. 30, 2009, provisional application No. 61/164,833, filed on Mar. 30, 2009, provisional application No. 61/164,827, filed on Mar. 30, 2009, provisional application No. 61/220,094, filed on Jun. 24, 2009.

(30) Foreign Application Priority Data

| May 25, 2009 | (EP) | 09160964 |
| May 25, 2009 | (EP) | 09160965 |
| May 25, 2009 | (EP) | 09160966 |
| May 25, 2009 | (EP) | 09160967 |
| Jun. 25, 2009 | (EP) | 09163698 |
| Aug. 19, 2009 | (EP) | 09168194 |

(51) Int. Cl.
| H01M 2/14 | (2006.01) |
| B01D 71/26 | (2006.01) |
| B01D 71/76 | (2006.01) |
| H01M 2/16 | (2006.01) |
| B32B 27/32 | (2006.01) |
| B29C 47/00 | (2006.01) |

(52) U.S. Cl.
CPC ............ *B01D 71/26* (2013.01); *B01D 71/76* (2013.01); *B29C 47/00* (2013.01); *B32B 27/32* (2013.01); *H01M 2/14* (2013.01); *H01M 2/16* (2013.01); *H01M 2/164* (2013.01); *H01M 2/1653* (2013.01)

(58) Field of Classification Search
CPC .................................................. H01M 2/1653
See application file for complete search history.

(56) References Cited

U.S. PATENT DOCUMENTS

| 6,054,498 A | 4/2000 | Hasegawa et al. | |
| 2005/0098913 A1 | 5/2005 | Funaoka et al. | |
| 2007/0221568 A1 | 9/2007 | Nagashiki et al. | |
| 2008/0057388 A1 | 3/2008 | Kono et al. | |
| 2008/0057389 A1* | 3/2008 | Kono | B01D 67/0009 429/144 |
| 2008/0193833 A1 | 8/2008 | Ohashi et al. | |
| 2009/0008816 A1 | 1/2009 | Takita et al. | |
| 2009/0226813 A1* | 9/2009 | Takita | B01D 67/0083 429/247 |
| 2010/0021808 A1 | 1/2010 | Takita et al. | |
| 2010/0316902 A1 | 12/2010 | Takita et al. | |
| 2011/0117439 A1* | 5/2011 | Yamada | B01D 67/0027 429/254 |

FOREIGN PATENT DOCUMENTS

| EP | 1 870 430 | 12/2007 | |
| EP | 1 947 138 | 7/2008 | |
| JP | 2002-338730 | 11/2002 | |
| KR | 10-2009-0023345 | 3/2009 | |
| WO | 97/23554 | 7/1997 | |
| WO | 2007/052663 | 5/2007 | |
| WO | 2007/132942 | 11/2007 | |
| WO | 2008/016174 | 2/2008 | |
| WO | 2008/026782 | 3/2008 | |
| WO | WO2008/026782 | * 3/2008 | .............. H01M 2/16 |

OTHER PUBLICATIONS

US Official Action for U.S. Appl. No. 13/259,195 dated Oct. 15, 2013.
US Official Action dated Jun. 9, 2014 from corresponding U.S. Appl. No. 13/260,658.
US Official Action dated Jun. 20, 2014 from corresponding U.S. Appl. No. 13/260,621.
US Official Action dated Jul. 6, 2015 from related U.S. Appl. No. 13/260,643.
US Official Action dated May 30, 2014 from corresponding U.S. Appl. No. 13/259,172.
US Official Action dated Sep. 18, 2014 from related U.S. Appl. No. 13/259,172.

(Continued)

*Primary Examiner* — Jacob Marks
(74) *Attorney, Agent, or Firm* — DLA Piper LLP (US)

(57) ABSTRACT

A multilayer microporous membrane including polymer and having a shutdown temperature of ≤130.5° C. and a storage stability of 0.3V or less.

9 Claims, No Drawings

(56) References Cited

OTHER PUBLICATIONS

Sun, T. et al., "Effect of Short Chain Branching on the Coil Dimensions of Polyolefins in Dilute Solution," *Macromolecules*, 2001, vol. 34, No. 19, pp. 6812-6820 (1 page Abstract).

* cited by examiner

MICROPOROUS POLYMERIC MEMBRANES, BATTERY SEPARATORS, AND PRODUCTION METHODS THEREFOR

CROSS-REFERENCE TO RELATED APPLICATIONS

This application claims priority from U.S. Provisional Application Ser. No. 61/177,060 filed May 11, 2009, and EP 09163698.5 filed Jun. 25, 2009; U.S. Provisional Application Ser. No. 61/164,824 filed Mar. 30, 2009, and EP 09160964.4 filed May 25, 2009; U.S. Provisional Application Ser. No. 61/164,817 filed Mar. 30, 2009, and EP 09160965.1 filed May 25, 2009; U.S. Provisional Application Ser. No. 61/164,833 filed Mar. 30, 2009 and EP 09160966.9 filed May 25, 2009; U.S. Provisional Application Ser. No. 61/164,827 filed Mar. 30, 2009 and EP 09160967.7 filed May 25, 2009; U.S. Provisional Application Ser. No. 61/220,094 filed Jun. 24, 2009 and EP 09168194.0 filed Aug. 19, 2009, the contents of each of which are incorporated by reference in their entirety.

FIELD OF THE INVENTION

The invention relates to a multilayer, microporous membrane having a shutdown temperature of 130.5° C. or less and a storage stability of 0.3 volts or less. The invention also relates to a battery separator formed by such a multilayer, microporous membrane, and a battery comprising such a separator. Another aspect of the invention relates to a method for making the multilayer, microporous membrane, a method for making a battery using such a membrane as a separator, and a method for using such a battery.

BACKGROUND OF THE INVENTION

Microporous membranes can be used as battery separators in, e.g., primary and secondary lithium batteries, lithium polymer batteries, nickel-hydrogen batteries, nickel-cadmium batteries, nickel-zinc batteries, silver-zinc secondary batteries, etc. When microporous membranes are used as battery separators, particularly as lithium ion battery separators, the membranes' performance significantly affects the properties, productivity and safety of the batteries. Accordingly, the microporous membrane should have suitable mechanical properties, heat resistance, permeability, dimensional stability, shutdown properties, meltdown properties, etc. It is desirable for the batteries to have a relatively low shutdown temperature and relatively high temperature stability for improved battery-safety properties, particularly for batteries that are exposed to high temperatures during manufacturing, charging, re-charging, overcharging, use, and/or storage. Improving separator permeability generally leads to an improvement in the battery's power and capacity. Low shutdown temperature is desired for improved battery safety, particularly when the battery is operated under overcharge conditions. Improved separator storage stability is desired because deterioration of separator at high temperature causes decreased battery voltage.

Microporous membranes comprising polyethylene having an amount of terminal unsaturation of more than about 0.2 per 10,000 carbon atoms have been disclosed for use as battery separators. These separators have a relatively low strength, but also provide a low shutdown temperature, which leads to improved battery safety as disclosed in WO1997/23554A and JP2002-338730A. Microporous membranes comprising polyethylene having such an amount of terminal unsaturation, however, have also been observed to deteriorate during battery storage and use. It is believed that the deterioration results at least in part from polyethylene oxidation reactions. Microporous membranes comprising polyethylene having an amount of terminal unsaturation of less than about 0.2 per 10,000 carbon atoms have also been disclosed as useful for battery separators. Batteries containing these separators show less deterioration during battery storage and use, but these batteries have a higher shutdown temperature.

Consequently, it would be desirable to provide a multilayer polyethylene membrane with an improved balance of shutdown temperature and oxidative resistance.

SUMMARY OF EMBODIMENTS OF THE INVENTION

In one aspect, embodiments of the invention provide a multilayer microporous membrane comprising polymer and having a shutdown temperature of ≤130.5° C. and a storage stability of 0.3 volts (V) or less.

In another aspect, embodiments of the invention provide a multilayer, microporous membrane, comprising: a first and third layer independently comprising 10 to 45 wt. % of a first polymer having a melting point, Tm, in the range of 115.0° C. to 130.0° C. and a weight average molecular weight, Mw, of from $5.0 \times 10^3$ to $4.0 \times 10^5$, 55 to 90 wt. % of a first polyethylene having an Mw of $<1.0 \times 10^6$ and an amount of terminal unsaturation<0.20 per 10,000 carbon atoms; and a second layer comprising 70 to 98 wt. % of a second polyethylene having an Mw<$1.0 \times 10^6$ and 2 to 30 wt. % of a polyethylene having an Mw≥$1.0 \times 10^6$; wherein the second layer is located between the first and third layers.

In another aspect, embodiments of the invention provide a method for producing a microporous membrane, comprising (a) combining a first polymer composition comprising at least a first polymer having a Tm in the range of 115.0° C. to 130.0° C. and an Mw of from $5.0 \times 10^3$ to $4.0 \times 10^5$ and a first polyethylene having an Mw<$1.0 \times 10^6$ and an amount of terminal unsaturation<0.20 per 10,000 carbon atoms with at least a first diluent; (b) combining a second polymer composition comprising at least a second polyethylene having an Mw<$1.0 \times 10^6$ with at least a second diluent; (c) forming a multilayer extrudate having a first layer containing the first polymer composition, a second layer containing the second polymer composition; and (d) removing at least a portion of the first and second diluents from the multilayer extrudate to produce the membrane.

In still another aspect, embodiments of the invention provide a battery comprising an anode, a cathode, and at least one separator located between the anode and cathode, wherein the separator comprises a first layer that comprises a first polymer having a Tm in the range of 115.0° C. to 130.0° C. and an Mw of from $5.0 \times 10^3$ to $4.0 \times 10^5$ and a first polyethylene having an Mw<$1.0 \times 10^6$ and an amount of terminal unsaturation<0.20 per 10,000 carbon atoms. In this aspect, the separator also includes a second layer comprising a polyethylene having an Mw<$1.0 \times 10^6$. Such a battery can be, e.g., a lithium ion primary or secondary battery and can be used, for example, as a power source for a power tool such as a battery-operated saw or drill, or for an electric vehicle or hybrid electric vehicle.

DETAILED DESCRIPTION OF EMBODIMENTS OF THE INVENTION

The claimed invention relates to the discovery of a multilayer, microporous film that has both a low shutdown temperature and better separator stability during battery storage and use.

In an embodiment, the multilayer, microporous membrane has at least one layer comprising a polyethylene having an amount of terminal unsaturation of less than 0.20 per 10,000 carbon atoms and a polymer having a 115.0° C.≤Tm≤130.0° C. and an Mw of from $5.0 \times 10^3$ to $4.0 \times 10^5$, referred to hereinafter as the "low melting point polymer." In this embodiment, the membrane also includes another layer comprising a polyethylene having an Mw of $<1.0 \times 10^6$ wherein a particular amount of terminal unsaturation in the polyethylene is not required in the layer.

Particular embodiments will now be described with respect to a three-layer membrane. In such embodiments, the membrane includes first and third layers comprising first polymer (P1) and third polymer (P3) respectively. The first and third polymer include a low melting polymer combined with a polyethylene or mixture of polyethylenes. Optionally, the polyethylenes or mixture of polyethylenes used in P3 are selected from the same polyethylenes or mixtures of polyethylenes as those used for P1. The polyethylenes selected for P1 and P3 have an amount of terminal unsaturation of less than 0.20 per 10,000 carbon atoms. The multilayer, microporous membrane also contains a second layer located between the first and third layers, wherein the second layer comprises a second polymer (P2) such as a polyethylene having an Mw<$1.0 \times 10^6$. It is believed that the selection of a polyethylene having a reduced amount of terminal unsaturations for the first and third layers provides storage stability that reduces membrane deterioration during battery storage and use. Including the low melting point polymer, particularly in an external layer, is believed to allow lower shutdown temperatures while maintaining a good balance of other properties, including puncture strength and shrink resistance provided by the second layer. Shutdown speed may also be improved by providing the shutdown function in the layers nearer the surface of the membrane. One skilled in the art will appreciate that the description of three-layer membranes can be applied to membranes having more than three layers and that this description is also consistent with two-layer membranes wherein one of the first or third layers is absent.

[1] Composition and Structure of the Microporous Membrane

In an embodiment, the microporous membrane comprises first and third layers independently comprising one or more polyethylenes having an Mw<$1.0 \times 10^6$, typically from $1.0 \times 10^5$ to $0.95 \times 10^6$ and an amount of terminal unsaturation of less than 0.20 per 10,000 carbon atoms (PE1). At least one of the first or third layers includes a low melting point polymer. The membrane also comprises a second layer located between the first and third layers and comprising one or more polyethylenes such as PE1. In embodiments where improved strength is desired, a polyethylene having an Mw<$1.0 \times 10^6$, typically from $1.0 \times 10^5$ to $0.95 \times 10^6$ and an amount of terminal unsaturation of ≥0.20, e.g., ≥0.25, per 10,000 carbon atoms (PE2) is used in the second layer. The total amount of the PE2 in the membrane is generally in the range from about 3 wt. % to 25 wt. %, e.g., from 5 wt. % to 18 wt. %, the weight percents being based on the total weight of polymer in the membrane. The thickness of the second layer is generally in the range of about 4% to about 25%, or from about 10% to about 20%, or from 10% to about 15% of the combined thickness of the first, second and third layers. In an embodiment, the first and third layers contain less than 5 wt. % or less than 1 wt. % of PE1, and the third layer contains less than 5 wt. % or less than 1 wt. % of PE1. In an embodiment, the first, second, and third layers consist essentially of polyethylene.

In another embodiment, the multilayer, microporous membrane further comprises a third polyethylene, the third polyethylene (PE3) having an Mw≥$1.0 \times 10^6$, typically about $1.8 \times 10^6$ to $2.3 \times 10^6$. In an embodiment, the first layer consists essentially of PE1, the low melting point polymer and PE3. In an embodiment, the first layer consists essentially of PE1 and the low melting point polymer optionally in combination with PE3, the second layer consists essentially of PE1 optionally in combination with PE3, and the third layer consists essentially of PE1 and the low melting point polymer optionally in combination with PE3.

In an embodiment, the multilayer, microporous membrane comprises three layers, wherein the first and third layers (also called the "surface" or "skin" layers) comprise outer layers of the membrane and the second layer is an intermediate layer (or "core" layer) located between the first and second layers. In a related embodiment, the multilayer, microporous membrane can comprise additional layers, i.e., in addition to the two skin layers and the core layer. For example, the membrane can contain additional core layers. The membrane can be a coated membrane, i.e., it can have one or more additional layers on or applied to the first and/or third layers. While it is not required, the core layer can be in planar contact with one or more of the skin layers in a stacked arrangement such as A/B/A with face-to-face stacking of the layers. The membrane can be referred to as a "polyolefin membrane" when the membrane contains polyolefin. While the membrane can contain polyolefin only, this is not required, and it is within the scope of the claimed invention for the polyolefin membrane to contain polyolefin and materials that are not polyolefin. In an embodiment, the membrane consists of polyethylene or consists essentially of polyethylene.

Although it is not required, the first and third layers can have the same thickness and composition. The combined thicknesses of the first and third layers can optionally be in the range of 70% to 96% of the total thickness of the multilayer, microporous membrane. For example, the thickness can be in the range of 75% to 85%, or 77% to 83%. The amount of PE1 in the first layer can optionally be in the range of 50 to 90 wt. %, or 55 to 70 wt. %, based on the weight of the first layer. The amount of low melting point polymer can be in the range of about 10 to about 50 wt. %, particularly about 15 to 30 wt. %. When the first layer contains PE3, the amount of P4 in the layer can be ≤45 wt. %, or about 10 to 25 wt. %, based on the weight of the layer. The amounts of PE1, the low melting point polymer and the optional PE3 in the third layer are generally in the same ranges as described for the first layer. In particular embodiments, the composition of the third layer may, but need not, be substantially the same as that of the first layer.

In an embodiment, the thickness of the second layer is in the range of about 4% to about 30%, or from about 15% to about 25%, or from 17% to about 23% of the total thickness of the multilayer, microporous membrane. The amount of PE2 in the second layer can optionally be in the range of 55 to 100 wt. %, or 75 to 95 wt. %, based on the weight of the layer. When the second layer contains PE3, the amount of PE3 in the layer can be in the range of greater than zero to 45 wt. %, or 5 to 25 wt. %, based on the weight of the layer.

Besides the PE1, PE2, and PE3, the membrane can optionally contain other polyolefins such as polypropylene, particularly where improved meltdown performance is desired.

In an embodiment, the membrane is a polyethylene membrane where the thicknesses of the first and third layers are equal, with each in the range of from about 35% to about 45%, for example about 40% of the total membrane thickness. In an embodiment, the first and third layers both comprise PE1 in an amount in the range of from about 50 wt. % to 65 wt. %, for example 55 wt. %. The amount of low melting point polymer in the first and third layers is equal, each in the range of 20 to 30 wt. %. The amount of PE3 in the first and third layers is in the range of from 15 wt. % to 30 wt. %, for example 17 to 20 wt. %. The amount of PE1 in the second layer is in the range of from about 75 wt. % to 85 wt. %, for example 80 to 83 wt. % and the amount of PE3 in the second layer is in the range of 15 wt. % to 25 wt. %, for example 17 to 20 wt. %.

The PE1, PE2, PE3, and the diluents used to produce the extrudate and the microporous membrane will now be described in more detail.

[2] Materials Used to Produce the Multilayer, Microporous Membrane

The polymer composition described herein comprises one or more polymers, particularly polyolefins, e.g., polyethylene, polypropylene, including polyethylene and polypropylene copolymers. The term polyethylene as used herein refers to a polyolefin homopolymer or copolymer containing recurring units derived from ethylene. Such polyethylenes include but are not limited to polyethylene homopolymer and/or copolymer wherein at least 85% (by number) of the recurring units are derived from ethylene. The term polypropylene as used herein refers to a polyolefin homopolymer or copolymer containing recurring units derived from propylene. Such polypropylenes include but are not limited to polypropylene homopolymer and/or copolymer wherein at least 85% (by number) of the recurring units are derived from propylene. Such polyethylenes and polypropylenes can be a mixture or reactor blend of individual polyethylenes or polypropylenes, respectively.

The first polyethylene (PE1) can be a high density polyethylene (HDPE) having an Mw in the range of from about $2.0 \times 10^5$ to about $0.95 \times 10^6$, a molecular weight distribution ("MWD") in the range of from about 2 to about 50, and a terminal unsaturation amount of <0.20 per 10,000 carbon atoms. In an embodiment, PE1 has an Mw in the range of from about $2.0 \times 10^5$ to about $9 \times 10^5$, for example about $4 \times 10^5$ to about $6 \times 10^5$, and an MWD of from about 3 to about 10. In an embodiment, PE1 has an amount of terminal unsaturation≤0.1 per 10,000 carbon atoms, or ≤0.10 per 10,000 carbon atoms, e.g., in the range of 0.05 to 0.14 per 10,000 carbon atoms.

PE2 can also be a HDPE having an Mw in the range of from about $2.0 \times 10^5$ to about $0.95 \times 10^6$, an MWD in the range of from about 2 to about 50, and having a terminal unsaturation amount ≥0.20 per 10,000 carbon atoms. In an embodiment, PE2 has an amount of terminal unsaturation≥0.30 per 10,000 carbon atoms, or ≥0.50 per 10,000 carbon atoms, e.g., in the range of 0.7 to 10 per 10,000 carbon atoms. A non-limiting example of the PE2 for use herein is one having an Mw in the range of from about $3.0 \times 10^5$ to about $7.0 \times 10^5$, for example about $7.0 \times 10^5$, and an MWD of from about 4 to about 50.

PE1 and PE2 can be an ethylene homopolymer, or an ethylene/α-olefin copolymer, such as, for example, one containing a small amount, e.g. about 5 mol.%, of one or more α-olefin comonomers. Suitable α-olefin comonomers include propylene, butene-1, pentene-1, hexene-1,4-methylpentene-1, octene-1, vinyl acetate, methyl methacrylate, styrene, and combinations thereof. The polymer can be produced, e.g., in a process using a Ziegler-Natta or single-site polymerization catalyst, but this is not required. The amount of terminal unsaturation can be measured in accordance with the procedures described in PCT Publication WO97/23554, for example.

PE3 can be, for example, an ultra-high molecular weight polyethylene (UHMWPE) having an Mw of from about $1.0 \times 10^6$ to about $5.0 \times 10^6$ and an MWD of from about 2 to about 100. A non-limiting example of PE3 for use herein is one that has an Mw of from about $1.0 \times 10^6$ to about $3.0 \times 10^6$, for example about $2.0 \times 10^6$, and an MWD of from about 2 to about 50, preferably about 4 to 15. PE3 can be an ethylene homopolymer, or an ethylene/α-olefin copolymer, such as, for example, one containing a small amount, e.g. about 5 mol. %, of one or more α-olefin comonomers. Suitable α-olefin comonomers include propylene, butene-1, pentene-1, hexene-1,4-methylpentene-1, octene-1, vinyl acetate, methyl methacrylate, styrene, and combinations thereof. Such copolymer can be produced using a single-site catalyst, though this is not required.

The low melting point polymer has a Tm in the range of from 115.0° C. to 130.0° C., and an Mw in the range of from $5.0 \times 10^3$ to $4.0 \times 10^5$. Thermal treatment temperatures (e.g., heat setting temperatures) >115.0° C. are generally used to produce thermally-stable membranes, and membrane permeability decreases when the heat setting temperature is ≥ the polymer's Tm. Thus, when the Tm is ≤115.0° C., it is more difficult to produce a thermally-stable membrane (one having low heat shrinkage, for example) without also reducing membrane permeability. When the first polymer's Tm is >131.0° C., it is more difficult to produce a microporous membrane having both high air permeability and low shutdown temperature. It has been discovered that when the first polymer's Mw is significantly <$5.0 \times 10^3$ or Mw is significantly >$4.0 \times 10^5$, it is more difficult to produce a microporous membrane having good air permeability even when Tm is relatively high, e.g., in the range of 125° C. to 130° C., or greater.

In an embodiment, the low melting point polymer comprises a polyethylene homopolymer or copolymer. Some useful polyethylene homopolymers and copolymers have an Mw in the range of from $8.0 \times 10^3$ to $2.0 \times 10^5$. In one embodiment, the polyethylene homopolymer or copolymer has an Mw in the range of from $1.0 \times 10^4$ to $1.0 \times 10^5$ or from $1.0 \times 10^4$ to $7.0 \times 10^4$. Optionally, the ethylene-based polymer has an MWD≤100, for example, in the range of from 1.5 to 20, from about 1.5 to about 5, or from about 1.8 to about 3.5.

In particular embodiments, the low melting point polymer comprises a copolymer of ethylene and a comonomer such as α-olefin. The comonomer is generally present in a relatively small amount compared to the amount of ethylene. For example, the comonomer amount is generally less than 10% by mol., based on 100% by mol., of the copolymer, such as from 1.0% to 5.0% by mol. The comonomer can be, for example, one or more of propylene, butene-1, pentene-1, hexene-1,4-methylpentene-1, octene-1, vinyl acetate, methyl methacrylate, styrene, or other monomers, particularly hexene-1 or octene-1. Such a copolymer can be produced using any suitable catalyst, including a single-site catalyst. For example, the polymer can be produced according to the methods disclosed in U.S. Pat. No. 5,084,534 (such as the methods disclosed therein in examples 27 and 41), which is incorporated by reference herein in its entirety. Comonomer content may be measured by $^1$H-NMR or other suitable method. Alternatively, the comonomer content may be estimated according to the procedure described by Mirabella and Christ in J. Polymer. Sci., Part B, 42, 3416-3427 (2004).

The amount of the low melting point polymer can be in the range from 6.0 to about 34 wt. %, based on the total weight of polymer in the membrane, such as from about 10 wt. % to 30 wt. % or 15.0 to 20.0 wt. %.

Tm is measured in accordance with JIS K7122 as follows. A sample of the first polyethylene is prepared as a 0.5-mm-thick molding that is melt-pressed at 210° C. and then stored for about 24 hours while exposed to a temperature of about 25° C. The sample is then placed in a sample holder of a differential scanning calorimeter (Pyris Diamond DSC available from Perkin Elmer, Inc.) and exposed to a temperature of 25° C. in a nitrogen atmosphere. The sample is then exposed to an increasing temperature (the first heating cycle) at a rate of 10° C./minute until a temperature of 230° C. is reached. The sample is exposed to the 230° C. temperature for 1 minute and then exposed to a decreasing temperature at a rate of 10° C./minute until a temperature of 30° C. is reached. The sample is exposed to the 30° C. temperature for 1 minute, and is then exposed to an increasing temperature at a rate of 10° C./minute (the second heating cycle) until a temperature of 230° C. is reached. The DSC records the amount of heat flowing to the sample during the second heating cycle. Tm is the temperature of the maximum heat flow to the sample as recorded by the DSC in the temperature range of 30° C. to 200° C. Polyethylene may show secondary melting peaks adjacent to the principal peak, and/or the end-of-melt transition, but for purposes herein, such secondary melting peaks are considered together as a single melting point, with the highest of these peaks being considered the Tm.

In an embodiment, the polyethylene homopolymer or copolymer has a Tm in the range of from 120.0° C. to 128.0° C., such as 120.0° C. to 126.0° C., or 120.5° C. to 124.5° C., or 121.0° C. to 124.0° C. In another embodiment, the polyethylene homopolymer or copolymer has a Tm in the range of from 122.0° C. to 126.0° C.

Mw and Mn of the polyethylenes are determined using a High Temperature Size Exclusion Chromatograph, or "SEC", (GPC PL 220, Polymer Laboratories), equipped with a differential refractive index detector (DRI). Three PLgel Mixed-B columns (available from Polymer Laboratories) are used. The nominal flow rate is 0.5 cm$^3$/min, and the nominal injection volume is 300 μL. Transfer lines, columns, and the DRI detector are contained in an oven maintained at 145° C. The measurement is made in accordance with the procedure disclosed in "*Macromolecules*, Vol. 34, No. 19, pp. 6812-6820 (2001)".

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. Polymer solutions are prepared by placing dry polymer in a glass container, adding the desired amount of above TCB solvent, then heating the mixture at 160° C. with continuous agitation for about 2 hours. The concentration of UHMWPE solution is 0.25 to 0.75 mg/ml. Sample solution will be filtered off-line before injecting to GPC with 2 μm filter using a model SP260 Sample Prep Station (available from Polymer Laboratories).

The separation efficiency of the column set is calibrated with a calibration curve generated using a seventeen individual polystyrene standards ranging in Mp from about 580 to about 10,000,000, which is used to generate the calibration curve. The polystyrene standards are obtained from Polymer Laboratories (Amherst, Mass.). A calibration curve (log Mp vs. retention volume) is generated by recording the retention volume at the peak in the DRI signal for each PS standard, and fitting this data set to a 2nd-order polynomial. Samples are analyzed using IGOR Pro, available from Wave Metrics, Inc.

Diluents Used to Produce the Multilayer, Microporous Membrane

The first, second, and third diluents can be, e.g., one or more of aliphatic, alicyclic or aromatic hydrocarbons such as nonane, decane, decalin, p-xylene, undecane, dodecane; liquid paraffin; and mineral oil distillates having boiling points comparable to those of the preceding hydrocarbons. Although it is not required, the first, second, and third diluents can be the same. In an embodiment, the diluent is a non-volatile liquid solvent for the polymers used to produce the extrudate. The diluent's viscosity is generally in the range of from about 30 cSt to about 500 cSt, or from about 30 cSt to about 200 cSt, when measured at a temperature of 25° C. Although the choice of viscosity is not particularly critical, when the viscosity at 25° C. is less than about 30 cSt, the mixture of polymer and diluent might foam, resulting in difficulty in blending. On the other hand, when the viscosity is more than about 500 cSt, it can be more difficult to remove the solvent from the extrudate.

In an embodiment, the total amount of diluent in the extrudate can be in the range, e.g., of from about 25 wt. % to about 80 wt. %, or 60 wt. % to 80 wt. % based on the weight of the extrudate, with the balance being the polymer used to produce the extrudate. In other embodiments, the extrudate contains an amount of diluent in the range of about 65 wt. % to 80 wt. %, or 70 wt. % to 75 wt. %.

While the extrudate and the microporous membrane can contain inorganic species (such as species containing silicon and/or aluminum atoms), and/or heat-resistant polymers such as those described in PCT Publications WO 2007/132942 and WO 2008/016174, these are not required. In an embodiment, the extrudate and membrane are substantially free of such materials. Substantially free in this context means the amount of such materials in the microporous membrane is less than 1.0 wt. %, based on the total weight of the polymer used to produce the extrudate.

The final microporous membrane generally comprises the polymers used to produce the extrudate. A small amount of diluent or other species introduced during processing can also be present, generally in amounts less than 1 wt. % based on the weight of the microporous polyolefin membrane. A small amount of polymer molecular weight degradation might occur during processing, but this is acceptable. In an embodiment, molecular weight degradation during processing, if any, causes the value of MWD of the polymer in the membrane to differ from the MWD of polymer before extrusion by no more than, e.g., about 10%, or no more than about 1%, or no more than about 0.1%.

[3] Production Method of Multilayer, Microporous Polyolefin Membrane

In an embodiment, the multilayer, microporous membrane comprises first and third microporous layers constituting the outer layers of the microporous membrane and a second layer situated between the first and third layers. The first layer is produced from P1 and diluent, the second layer is produced from P2 and diluent and the third layer is produced from P3 and diluent.

For example, one method for producing a multilayer membrane comprises (a) combining P1, which comprises a PE1 and at least a first low melting point polymer with at least one first diluent, and (b) combining at least P2, which comprises PE1 or PE2 with at least one second diluent. Where a three-layer membrane is desired, such a method includes combining P3, e.g., at least a PE1 and a low melting point polymer, with at least a third diluent.

The method also includes coextruding at least a portion of the combined P1 and first diluent through at least one die while co-extruding portions of at least combined P2 and the second diluent to form a multilayer extrudate having first and second layers containing the P1 and P2, respectively. When a three-layer membrane is formed, at least a portion of the combined P3 and third diluent is co-extruded through at least one die to form a third layer such that the second layer comprising P2 is located between the first and third layers; optionally the total amount of low melting point polymer is in the range of 1.0 to 50 wt. %, based on the weight of P1.

The method further includes removing at least a portion of the first, second, and third diluents from the extrudate to produce the multilayer, microporous membrane. The size of the membrane in the transverse direction (TD) can be called the first dry width and the size of the membrane in the machine direction (MD) can be called the first dry length. If desired the method can further comprise stretching the dried extrudate in the transverse direction from the first dry width to a second dry width, that is larger than the first dry width by a magnification factor in the range of from about 1.1 to 1.6, without changing the first dry length to produce a stretched membrane. The stretching can be conducted while exposing the dried extrudate to a temperature in the range of 116° C. to 130° C., for example from 118° C. to 129° C.

Additional optional steps that are generally useful in the production of microporous membranes can be used. For example, an optional extrudate cooling step, an optional extrudate stretching step, an optional hot solvent treatment step, an optional heat setting step, an optional cross-linking step with ionizing radiation, and an optional hydrophilic treatment step, etc., all as described in PCT Publications WO2007/132942 and WO2008/016174 can be conducted if desired. Neither the number nor order of these optional steps is critical.

(1) and (2) Combining Polymer and Diluent

The polymers as described above can be combined, e.g., by dry mixing or melt blending, and then combined with an appropriate diluent (or mixture of diluents) to produce a mixture of polymer and diluent. Alternatively, the polymer(s) and diluent can be combined in a single step. The first, second, and third diluents can be the same or different, e.g., the same or different liquid paraffin. When the diluent is a solvent for one or more of the polymers, the mixture can be called a polymeric solution. The mixture can contain additives, such as one or more antioxidant. In an embodiment, the amount of such additives does not exceed 1 wt. % based on the weight of the polymeric solution. The choice of mixing conditions, extrusion conditions, etc. can be the same as those disclosed in PCT Publication No. WO 2008/016174, for example.

(3) Extrusion

In an embodiment, the combined polymer and diluent are conducted from an extruder to a die.

The extrudate or cooled extrudate (as hereinafter described) should have an appropriate thickness to produce, after the stretching steps, a final membrane having the desired thickness. For example, the extrudate can have a thickness in the range of about 0.2 mm to 2 mm, or 1.2 mm to 1.8 mm. Process conditions for accomplishing this extrusion can be the same as those disclosed in PCT Publications WO 2007/132942 and WO 2008/016174, for example. MD is defined as the direction in which the extrudate is produced from the die. TD is defined as the direction perpendicular to both MD and the thickness direction of the extrudate. The extrudate can be produced continuously from a die, or it can be produced discontinuously as is the case in batch processing for example. The definitions of TD and MD are the same in both batch and continuous processing. While the extrudate can be produced by coextruding (a) the combined P1 (and optionally an HDPE and/or UHMWPE) with the first diluent, (b) P2 (and optionally an HDPE and/or UHMWPE) with the second diluent, and (c) P3 (and optionally HDPE and/or UHMWPE) with the third diluent, this is not required. Any method capable of producing a layered extrudate of the foregoing composition can be used, e.g., lamination. When lamination is used to produce the membrane, the diluent(s) can be removed before or after the lamination.

Optional Cooling

If desired, the multilayer extrudate can be exposed to a temperature in the range of 15° C. to 25° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publications No. WO 2008/016174 and WO 2007/132942, for example. In an embodiment, the cooled extrudate has a thickness in the range of 1.2 mm to 1.8 mm, or 1.3 mm to 1.7 mm.

Optional Stretching

If desired, the extrudate or cooled extrudate can be stretched in at least one direction (e.g., at least one planar direction, such as MD or TD) to produce a stretched extrudate. For example, the extrudate can be stretched simultaneously in the transverse and machine directions to a magnification factor in the range of 4 to 6 while exposing the extrudate to a temperature in the range of about 110° C. to 120° C., e.g., 112° C. to 118° C., or 113° C. to 115° C. Suitable stretching methods are described in PCT Publications No. WO 2008/016174 and WO 2007/13294, for example. While not required, the MD and TD magnifications can be the same. In an embodiment, the stretching magnification is equal to 5 in MD and TD and the stretching temperature is 115.0° C. In another embodiment, the stretching magnification is equal to 5 in MD and TD and the stretching temperature is 113.0° C.

(4) Diluent Removal

At least a portion of the diluents are removed (or displaced) from the stretched extrudate to form the membrane. A displacing (or "washing") solvent can be used to remove (wash away, or displace) the diluent, as described in PCT Publications No. WO 2008/016174 and WO 2007/132942, for example. It is not necessary to remove all diluent from the stretched extrudate, although it can be desirable to do so since removing diluent increases the porosity of the final membrane.

In an embodiment, at least a portion of any remaining volatile species, such as washing solvent, can be removed from the membrane at any time after diluent removal. Any method capable of removing the washing solvent can be used, including conventional methods such as heat-drying, wind-drying (moving air), etc. Process conditions for removing volatile species such as washing solvent can be the same as those disclosed in PCT Publications No. WO 2008/016174 and WO 2007/132942, for example.

(5) Optional Stretching of the Membrane (Dry Orientation)

The membrane can be stretched to produce a stretched membrane. At the start of this step, the membrane has an initial size in MD (a first dry length) and an initial size in TD (a first dry width). The membrane is stretched in TD from the first dry width to a second dry width that is larger than the first dry width by a magnification factor in the range of from about 1.1 to about 1.6 (e.g., 1.20 to 1.40), without changing the first dry length. The stretching can be conducted while exposing the dried extrudate to a temperature in the range of 110° C. to 129° C., for example from 118° C. to 123° C. or 120° C. to 122° C. In an embodiment, the stretching is conducted at 121.2° C. The dry stretching is generally conducted while exposing the dried membrane to a temperature≤Tm, e.g., in the range of from about Tcd-30° C. to Tm, where the relevant Tm for this step is the Tm of the polymer having the lowest Tm among the polymers used, and Tcd is the crystal dispersion temperature.

As used herein, the term "first dry width" refers to the size of the dried extrudate in the transverse direction prior to the start of dry orientation. The term "first dry length" refers to the size of the dried extrudate in the machine direction prior to the start of dry orientation.

The stretching rate is preferably 1%/second or more in TD. The stretching rate is preferably 2%/second or more, more preferably 3%/second or more, e.g., in the range of 2%/second to 10%/second. Though not particularly critical, the upper limit of the stretching rate is generally about 50%/second.

(6) Optional Controlled Reduction of Width

Following the dry stretching, the dried membrane is subjected to a controlled reduction in width from the second dry width to a third width, the third dry width being in the range of from the first dry width to about 1.3 times larger than the first dry width. In an embodiment, the second dry width is 1.4 times larger and the third width is 1.2 times larger, each with respect to the first width. The width reduction generally conducted while the membrane is exposed to a temperature ≥Tcd-30° C., but less than Tm. The relevant Tm for this step is the Tm of the polymer having the lowest Tm among the polymers used. For example, during width reduction the membrane can be exposed to a temperature in the range of from about 70° C. to about 135° C., such as from about 116° C. to about 132° C., e.g., from about 118° C. to about 119° C. In an embodiment, the decreasing of the membrane's width is conducted while the membrane is exposed to a temperature that is lower than Tm. In an embodiment, the third dry width is in the range of from 1.0 times larger than the first dry width to about 1.6 times, e.g., 1.2 to 1.5 times, larger than the first dry width.

It is believed that exposing the membrane to a temperature during the controlled width reduction that is ≥ the temperature to which the membrane is exposed during the TD stretching leads to greater resistance to heat shrinkage in the finished membrane.

Optional Heat-Setting

Optionally, the membrane is thermally treated (heat-set) one or more times after diluent removal, e.g., after dry stretching, the controlled width reduction, or both. It is believed that heat-setting stabilizes crystals and make uniform lamellas in the membrane. In an embodiment, the heat setting is conducted while exposing the membrane to a temperature in the range Tcd to Tm, where the relevant Tm for this step is the Tm of the polymer having the lowest Tm among the polymers used, e.g., a temperature in the range of from about 100° C. to about 129° C., such as from about 118° C. to 123° C. or 120° C. to 122° C. In an embodiment, the stretching is conducted at 121.2° C. Generally, the heat setting is conducted for a time sufficient to form uniform lamellas in the membrane, e.g., a time in the range of 1 to 1000 seconds, particularly 500 to about 750 seconds. In an embodiment, the heat setting is operated under conventional heat-set "thermal fixation" conditions. The term "thermal fixation" refers to heat-setting carried out while maintaining the length and width of the membrane substantially constant, e.g., by holding the membrane's perimeter using tenter clips during the heat setting.

Optionally, an annealing treatment can be conducted after the heat-set step. The annealing is a heat treatment with no load applied to the membrane, and may be conducted by using, e.g., a heating chamber with a belt conveyer or an air-floating-type heating chamber. The annealing may also be conducted continuously after the heat-setting with the tenter slackened. During annealing the membrane can be exposed to a temperature in the range of Tm or lower, e.g., in the range from about 60° C. to about Tm-5° C. Annealing is believed to provide the microporous membrane with improved permeability and strength.

Optional heated roller, hot solvent, cross linking, hydrophilizing, and coating treatments can be conducted if desired, e.g., as described in PCT Publication No. WO 2008/016174.

Optionally, an annealing treatment can be conducted before, during, or after the heat-setting. The annealing is a heat treatment with no load applied to the membrane, and can be conducted by using, e.g., a heating chamber with a belt conveyer or an air-floating-type heating chamber. The annealing can be conducted continuously, e.g., after the heat-setting with the tenter slackened. The temperature to which the membrane is exposed during annealing, (the "annealing temperature") can be, e.g., in a range from about 116° C. to 125° C. Annealing is believed to provide the microporous membrane with improved heat shrinkage and strength.

Optional heated roller, hot solvent, cross linking, hydrophilizing and coating treatments can be conducted if desired, e.g., as described in PCT Publication No. WO2008/016174.

[4] The Properties of a Multilayer, Microporous Membrane

In an embodiment, the multilayer, microporous polyethylene membrane has relatively low shutdown temperature of ≤130.5° C. and an oxidation resistance characterized by a storage stability of 0.3V or less. The membrane generally has a thickness ranging from about 3 µm to about 200 µm, or about 5 µm to about 50 µm, and preferably 15 µm to about 25 µm. Characteristics possessed by one or more embodiments of the membranes of the invention are described in the following sections.

A. Shutdown Temperature of ≤130.5° C. or Less

The microporous membrane's shutdown temperature is measured by the method disclosed in PCT Publication No. WO2007/052663, which is incorporated by reference herein in its entirety. According to this method, the microporous membrane is exposed to an increasing temperature (5° C./minute) while measuring the membrane's air permeability. The microporous membrane's shutdown temperature is defined as the temperature at which the microporous membrane's air permeability (Gurley Value) first exceeds 100,000 secs./100 cm$^3$. The microporous membrane's air permeability is measured according to JIS P8117 using an air permeability meter (EGO-1T available from Asahi Seiko Co., Ltd.). In an embodiment, the shutdown temperature is 126° C. to 130° C. In another embodiment the shutdown temperature is 128° C.

B. Electrochemical Properties

1. Storage Stability (Voltage Measurement)

Storage stability is a property of the membrane that is related to the membrane's resistance to oxidation when the membrane is used as a battery separator and the battery is exposed to relatively high-temperature storage or use. Storage stability has the units of volts, and a lower voltage, representing less battery voltage loss during high-temperature storage or overcharging, is generally desired. For automotive batteries, such as those used for starting or powering motor means for moving an electric vehicle or hybrid electric vehicle, and for power tool batteries, a storage stability of 0.3V or less is desired since those relatively high-power, high capacity applications are particularly sensitive to any loss in battery voltage. Generally, but in particular for high-capacity batteries, battery capacity is significantly reduced when battery voltage drops below 4.0V. Consequently, separators having a storage stability of 0.3V or less are generally desired for these batteries.

To measure membrane storage stability, a membrane having a length (MD) of 70 mm and a width (TD) of 60 mm is located between and anode and cathode having the same planar dimensions as the membrane. The anode is made of natural graphite and the cathode is made of $LiCoO_2$. An electrolyte is prepared by dissolving $LiPF_6$ into a mixture of ethylene carbonate (EC) and methylethyl carbonate (EMC) (4/6, V/V) as 1 M solution. The electrolyte is impregnated into the membrane in the region between the anode and the cathode to complete the battery. The battery is charged to a voltage of 4.2V at a temperature of 23° C. The battery is then exposed to a temperature of 60° C. for two days, and the battery voltage is then measured. The storage stability of the membrane is defined as the difference between 4.2V and the battery voltage measured after storage. In an embodiment, the membrane has a storage stability ≤0.3 V, such as in the range of 0.01 V to 0.25V.

2. Electrochemical Stability (Current Measurement)

Electrochemical stability is a membrane property related to the membrane's resistance to chemical changes, e.g., oxidation, when the membrane is used as a BSF in a battery exposed to relatively high-temperature storage or use. Electrochemical stability has the units of mAh, and a lower value, representing less integrated charge loss during high-temperature storage or overcharging, is generally desired. The membranes of the invention have improved electrochemical stability and are therefore useful in high-power, high-capacity batteries. Such batteries include power tool batteries and automotive batteries, e.g., those used for starting or powering motor means for moving an electric vehicle or hybrid electric vehicles. The membranes have an electrochemical stability ≤$1.0 \times 10^2$ mAh, which is desirable because such relatively high-power, high capacity applications are particularly sensitive to losses in battery capacity, such as self-discharge losses resulting from electrochemical instability of the BSF. The term "high-capacity" batteries generally means batteries capable of supplying 1 Ampere hour (1 Ah) or more, e.g., 2.0 Ah to 3.6 Ah. In an embodiment, the membrane's electrochemical stability is ≤80.0 mAh, such as ≤75.0 mAh, e.g., ≤60.0 mAh. In an embodiment, the membrane's electrochemical stability is in the range of 1.0 mAh to 75.0 mAh, optionally 10.0 mAh to 60.0 mAh.

To measure membrane electrochemical stability, a membrane having a length (MD) of 70 mm and a width (TD) of 60 mm is located between an anode and cathode having the same planar dimensions as the membrane. The anode is made of natural graphite and the cathode is made of $LiCoO_2$. An electrolyte is prepared by dissolving $LiPF_6$ into a mixture of ethylene carbonate (EC) and methylethyl carbonate (EMC) (4/6, V/V) as 1 M solution. The electrolyte is impregnated into the membrane in the region between the anode and the cathode to complete the battery. The battery is charged to a voltage of 4.2 V while exposed to a temperature of 23° C. The battery is then exposed to temperature of 60° C. for 48 hours. Electrochemical stability is defined as the integrated current (in mAh) flowing between the voltage source and the battery over the 48-hour period.

C. Normalized Air Permeability of ≤700 secs./100 $cm^3$/20 μm

In an embodiment, the membrane's normalized air permeability (Gurley value) is ≤700 secs./100 $cm^3$/20 μm. Normalized air permeability is measured according to JIS P8117, and the results are normalized to the permeability value of an equivalent membrane having a thickness of 20 μm using the equation $A = 20 \mu m*(X)/T_1$, where X is the measured air permeability of a membrane having an actual thickness $T_1$ and A is the normalized air permeability of an equivalent membrane having a thickness of 20 μm. Since the air permeability value is normalized to an equivalent membrane having thickness of 20 μm, the air permeability value is expressed in units of "secs./100 $cm^3$/20 μm". In an embodiment, the normalized air permeability is in the range of 400 to about 600 secs./100 $cm^3$/20 μm, or 150 to 375 secs./100 $cm^3$/20 μm.

D. Pin Puncture Strength of About 1000 mN/20 μm μm or More

The pin puncture strength (converted to the value at a 20-μm membrane thickness) is ≥1000 mN/20 μm. Pin puncture strength is defined as the maximum load measured when a microporous membrane having a thickness of $T_1$ is pricked with a needle of 1 mm in diameter with a spherical end surface (radius R of curvature: 0.5 mm) at a speed of 2 mm/second. The pin puncture strength may be normalized to a value at a membrane thickness of 1 μm using the equation $S_2 = 20 \mu m*(S_1)/T_1$, where $S_1$ is the measured pin puncture strength, $S_2$ is the normalized pin puncture strength, and $T_1$ is the average thickness of the membrane. In an embodiment, the pin puncture is >3000 mN/20 μm and in another embodiment, the pin puncture strength is 3750 to 4500 mN/20 μm.

E. Porosity of About 25% to About 80%

The membrane's porosity is measured conventionally by comparing the membrane's actual weight to the weight of an equivalent non-porous membrane of 100% polyethylene (equivalent in the sense of having the same length, width, and thickness). Porosity is then determined using the formula: Porosity % = 100×(w2−w1)/w2, wherein "w1" is the actual weight of the microporous membrane and "w2" is the weight of an equivalent non-porous membrane of 100% polyethylene having the same size and thickness.

F. Rupture Temperature

In an embodiment, the membrane's rupture temperature is ≥145° C., e.g., in the range of 150° C. to 200° C., or 148° C. to 151° C. Rupture temperature is measured as follows. A microporous membrane of 5 cm×5 cm is sandwiched by blocks each having a circular opening of 12 mm in diameter, and a tungsten carbide ball of 10 mm in diameter is placed on the microporous membrane in the circular opening. The membrane is then exposed to an increasing temperature at a rate of 5° C./minute. The membrane's rupture temperature is defined as the temperature at which the ball first breaks through the membrane. The membrane's rupture temperature is defined as the temperature at which the ball completely penetrates the sample, i.e., the temperature at which the sample breaks.

G. Meltdown Temperature of 145° C. or Higher

Meltdown temperature is measured by the following procedure: A rectangular sample of 3 mm×50 mm is cut out of the microporous membrane such that the long axis of the sample is aligned with the transverse direction of the microporous membrane as it is produced in the process and the short axis is aligned with the machine direction. The sample is set in the thermomechanical analyzer (TMA/SS6000 available from Seiko Instruments, Inc.) at a chuck distance of 10 mm, i.e., the distance from the upper chuck to the lower chuck is 10 mm. The lower chuck is fixed and a load of 19.6 mN applied to the sample at the upper chuck. The chucks and sample are enclosed in a tube which can be heated. Starting at 30° C., the temperature inside the tube is elevated at a rate of 5° C./minute, and sample length change under the 19.6 mN load is measured at intervals of 0.5 second and recorded as temperature is increased. The temperature is increased to 200° C. The meltdown temperature of the sample is defined as the temperature at which the sample breaks, generally at a temperature in the range of about 145° C. to about 200° C.

H. TD and MD Heat Shrinkage Ratio at 105° C. of Less than 5.5%

The shrinkage ratio of the microporous membrane in orthogonal planar directions (e.g., TD and MD) at 105° C. is measured as follows:

(i) Measure the size of a test piece of the microporous membrane at ambient temperature in both MD and TD, (ii) equilibrate the test piece of the microporous membrane at a temperature of 105° C. for 8 hours with no applied load, and then (iii) measure the size of the membrane in both MD and TD. The heat (or "thermal") shrinkage ratio in either MD or TD can be obtained by dividing the result of measurement (i) by the result of measurement (ii) and expressing the resulting quotient as a percent.

In an embodiment, the microporous membrane has an MD and TD heat shrinkage ratio at 105° C. in the range of 1.0% to 5%, e.g., 2% to 4.0%.

[5] Battery Separator

In an embodiment, the battery separator formed by the above multilayer, microporous polyolefin membrane has a thickness in the range of about 3 µm to about 200 µm, or about 5 µm to about 50 µm. Depending, e.g., on the choice of electrolyte, separator swelling might increase the final thickness to a value larger than 200 µm.

[6] Battery

The microporous membranes of the invention are useful as battery separators in e.g., lithium ion primary and secondary batteries. Such batteries are described in PCT publication WO 2008/016174.

The battery is useful as a source (or sink) of electric charge to (or from) one or more electrical or electronic components. Such components include passive components such as resistors, capacitors, inductors, including, e.g., transformers; electromotive devices such as electric motors and electric generators, and electronic devices such as diodes, transistors, and integrated circuits. The components can be connected to the battery in series and/or parallel electrical circuits to form a battery system. The circuits can be connected to the battery directly or indirectly. For example, electrical energy produced by the battery can be converted electrochemically (e.g., by a second battery or fuel cell) and/or electromechanically (e.g., by an electric motor operating an electric generator) before the electrical energy is dissipated or stored in a one or more of the components. The battery system can be used as a power source for powering relatively high power devices such as electric motors for driving power tools and electric or hybrid electric vehicles.

EXAMPLES

The present invention will be explained in more detail referring to the following non-limiting examples.

Example 1

(1) Preparation of First Polyolefin Solution

A first polymer composition (P1) is prepared by dry-blending (a) 57.0 wt. % of a polyethylene resin having an Mw of 5.6×10$^5$ and an MWD of 4.1, and a terminal unsaturation level of 0.11/10,000 C (PE1), (b) 25.0 wt. % of a low melting point polyethylene (produced using a single site catalyst) having a melt index of 204.07 g/10 min (MI, determined according to ASTM D-1238, Condition 190° C./2.16 kg (formally known as "Condition (E)" and also known as I$_2$), an MWD of 2.5, and a Tm of 122.8° C., a density of 0.9401 g/cm$^3$, a $\Delta H_f$ of 162.1 J/g and (c) 18.0 wt. % of a polyethylene resin having an Mw of 2.0×10$^6$ and an MWD of 5.1, and a negligible terminal unsaturation level (PE3).

25 wt. % of the resultant first polymer composition is charged into a strong-blending double-screw extruder having an inner diameter of 58 mm and L/D of 42, and 75 wt. % of liquid paraffin (50 cst at 40° C.) is supplied to the double-screw extruder via a side feeder to produce a first polymer solution. The weight percents are based on the weight of the first polymer solution. Melt-blending is conducted at 210° C. and 200 rpm.

(2) Preparation of Second Polyolefin Solution

A second polymer composition (P2) is prepared by dry-blending (a) 82.0 wt. % of a polyethylene resin having an Mw of 5.6×10$^5$, an MWD of 4.1 and a terminal unsaturation level of 0.11/10,000C, a Tc of 135° C., and a Tcd of 100° C. (PE1) and (b) 18 wt. % of a polyethylene resin having an Mw of 2.0×10$^6$ and an MWD of 5.1 and a negligible terminal unsaturation level (PE3), the percentages being based on the weight of the second polymer composition.

25 wt. % of P2 is charged into a second strong-blending double-screw extruder having an inner diameter of 58 mm and L/D of 42, and 75 wt. % of liquid paraffin (50 cst at 40° C.) is supplied to the double-screw extruder via a side feeder to produce the second polymer solution. The weight percents are based on the weight of the second polyolefin solution. Melt-blending is conducted at 210° C. and 200 rpm.

(3) Membrane Production

The first and second, and third polymer solutions are supplied from their respective double-screw extruders to a three-layer-extruding T-die, and extruded therefrom to produce a layered extrudate (also called a laminate) of first polymer solution layer/second polymer solution layer/third polymer solution layer at a layer thickness ratio of 45.3/9.4/45.3. Alternatively, where the polymer in the first and third layers is the same, only a first or third polymer solution need be used and that solution may be fed into the die to produce the membrane using only two extruders. The extrudate is cooled while passing through cooling rollers controlled at 20° C., producing an extrudate in the form of a three-layer gel-like sheet. The gel-like sheet is biaxially stretched (simultaneously) in MD and TD while exposed to a temperature of 115° C. (the "biaxial stretching temperature") to a magnification of 5 fold in each of MD and TD by a tenter-stretching machine. The stretched three-layer gel-like sheet is fixed to an aluminum frame of 20 cm×20 cm, immersed in a bath of methylene chloride controlled at 25° C. for three minutes to remove the liquid paraffin, and dried by air flow at room temperature to produce a dried membrane. The dried membrane is then dry stretched. Before dry stretching, the dried membrane has an initial dry length (MD) and an initial dry width (TD). The dried membrane is first dry-stretched in TD to a magnification of 1.4 fold while exposed to a temperature of 121.2° C. (the "TD stretching temperature"), resulting in a second dry length. The membrane's width (MD) remains approximately equal to the initial dry width during the TD dry stretching. Following TD dry-stretching, the membrane is subjected to a controlled reduction in width (TD) from the second dry width to a final magnification of 1.2 fold, the final magnification being based on the initial width of the membrane at the start of dry stretching, while exposed to a temperature of at 121.2° C. (the "width reduction temperature"). The membrane's length (MD) remains approximately equal to the second dry length during the width reduction. The membrane, which remains fixed to the batch-stretching machine, is then heat-set while exposed to a temperature of 121.2° C. (the "heat set temperature") for 10 minutes to produce the final multilayer microporous membrane.

Comparative Example 1

Preparation of Skin Layer Polyethylene Solution

A polymer solution is produced from a polyethylene composition comprising (a) 82 wt. % of PE2 having an Mw of $7.5 \times 10^5$ and an amount of terminal unsaturation greater than 0.20 per 10,000 carbon atoms, and (b) 18% of PE3 having an Mw of $1.9 \times 10^6$ and an MWD of 5, which is prepared by dry-blending. The polyethylene in the composition has a melting point of 135° C. The polymer solution used to produce the core layer is prepared by combining 35 wt. % of the core layer polyethylene composition and 70 wt. % of liquid paraffin (50 cst at 40° C.) in a strong-blending extruder, the weight percents being based on the total weight of the polymer solution used to produce the core layer. The polymer and diluent are combined at a temperature of 210° C.

Production of Membrane

The polymer solution is supplied from a double-screw extruder to an extruding T-die, and extruded therefrom to form a monolayer extrudate. The extrudate is cooled while passing through cooling rollers controlled at 20° C., to form a three-layer extrudate (in the form of a gel-like sheet), which is simultaneously biaxially stretched at 115° C. to a magnification of 5 fold in both MD (longitudinal) and TD (transverse) by a tenter-stretching machine. The stretched extrudate is then immersed in a bath of methylene chloride at 25° C. to remove the liquid paraffin to an amount of 1 wt. % or less based on the weight of liquid paraffin present in the polyolefin solution, and then dried in flowing air at room temperature. The dried membrane is heat-set by a tenter-type machine while exposed to a temperature of 126.7° C. for 27 seconds to produce a monolayer microporous membrane.

Comparative Example 2

Preparation of the Polyethylene Solution

A polyethylene composition comprising (a) 70 wt. % of PE1 having an Mw of $5.6 \times 10^5$ and an amount of terminal unsaturation less than 0.20 per 10,000 carbon atoms, (b) 30% of PE3 having an Mw of $1.9 \times 10^6$ and an MWD of 5, which is prepared by dry-blending. The polyethylene in the composition has a melting point of 135° C.

The polymer solution is prepared by combining 28.5 wt. % of the polyethylene composition and 71.5 wt. % of liquid paraffin (50 cst at 40° C.) in a strong-blending extruder, the weight percents being based on the total weight of the polymer solution used to produce the skin layers. The polymer and diluent are combined at a temperature of 210° C.

Production of Membrane

The polymer solution is supplied from a double-screw extruder to an extruding T-die, and extruded therefrom to form a monolayer extrudate. The extrudate is cooled while passing through cooling rollers controlled at 20° C. to form a three-layer extrudate (in the form of a gel-like sheet), which is simultaneously biaxially stretched at 115° C. to a magnification of 5 fold in both MD (longitudinal) and TD (transverse) by a tenter-stretching machine. The stretched extrudate is then immersed in a bath of methylene chloride at 25° C. to remove the liquid paraffin to an amount of 1 wt. % or less based on the weight of liquid paraffin present in the polyolefin solution, and then dried in flowing air at room temperature. The dried extrudate is stretched (dry orientation) to a magnification of 1.3 fold in TD while exposed to a temperature of 126.7° C. and sequentially contracted to magnification of 1.2 fold in TD while exposed to a temperature of 126.7° C. Following stretching, the dried membrane is heat-set by a tenter-type machine while exposed to a temperature of 128.0° C. for 27 seconds to produce a three-layer microporous membrane.

Comparative Example 3

Preparation of Skin Layer Polyethylene Solution

The core layer is produced from a polyethylene composition comprising (a) 70 wt. % of PE1 having an Mw of $5.6 \times 10^5$ and an amount of terminal unsaturation less than 0.20 per 10,000 carbon atoms, (b) 30% of PE3 having an Mw of $1.9 \times 10^6$ and an MWD of 5, which is prepared by dry-blending. The polyethylene in the composition has a melting point of 135° C.

The polymer solution used to produce the core is prepared by combining 28.5 wt. % of the polyethylene composition (PE2 is the same as PE1) and 71.5 wt. % of liquid paraffin (50 cst at 40° C.) in a strong-blending extruder, the weight percents being based on the total weight of the polymer solution used to produce the skin layers. The polymer and diluent are combined at a temperature of 210° C.

Preparation of the Skin Layers Polyethylene Solution

A skin-layer polymer solution is produced from a polyethylene composition comprising (a) 70 wt. % of PE2 having an Mw of $7.5 \times 10^5$ and an amount of terminal unsaturation greater than 0.20 per 10,000 carbon atoms and (b) 30% of PE3 having an Mw of $1.9 \times 10^6$ and an MWD of 5, which is prepared by dry-blending. The polyethylene in the composition has a melting point of 135° C. The polymer solution used to produce the core layer is prepared by combining 35 wt. % of the core layer polyethylene composition and 70 wt. % of liquid paraffin (50 cst at 40° C.) in a strong-blending extruder, the weight percents being based on the total weight of the polymer solution used to produce the core layer. The polymer and diluent are combined at a temperature of 210° C.

Production of Membrane

The polymer solutions are supplied from their respective double-screw extruders to a three-layer-extruding T-die, and extruded therefrom to form an extrudate at a layer thickness ratio of 33.5/33.0/33.5 (skin/core/skin). The extrudate is cooled while passing through cooling rollers controlled at 20° C. to form a three-layer extrudate (in the form of a gel-like sheet), which is simultaneously biaxially stretched at 115° C. to a magnification of 5 fold in both MD (longitudinal) and TD (transverse) by a tenter-stretching machine. The stretched extrudate is then immersed in a bath of methylene chloride at 25° C. to remove the liquid paraffin to an amount of 1 wt. % or less based on the weight of liquid paraffin present in the polyolefin solution and then dried in flowing air at room temperature. The dried extrudate is stretched (dry orientation) to a magnification of 1.3 fold in TD while exposed to a temperature of 126.7° C. and sequentially contracted to magnification of 1.2 fold in TD while exposed to a temperature of 126.5° C. Following stretching, the dried membrane is heat-set by a tenter-type machine while exposed to a temperature of 125.0° C. for 27 seconds to produce a three-layer microporous membrane.

TABLE 1

| No | Ex 1 | Comp. Ex 1 | Comp. Ex 2 | Comp. Ex 3 |
|---|---|---|---|---|
| Polyethylene (I) Low Tm Polymer | | | | |
| Mw | $2.7 \times 10^4$ | — | | |
| Mw/Mn | 2.5 | — | | |
| % by mass | 25 | — | | |
| PE1 | | | | |
| Mw | $5.6 \times 10^5$ | — | $5.6 \times 10^5$ | $5.6 \times 10^5$ |
| Mw/Mn | 4.1 | — | 4.1 | 4.1 |
| % by mass | 57 | — | 70 | 82 |
| PE3 | | | | |
| Mw | $1.9 \times 10^6$ | | $1.9 \times 10^6$ | $1.9 \times 10^6$ |
| Mw/Mn | 5.1 | | 5.1 | 5.1 |
| % by mass | 18 | | 30 | 30 |
| Conc. of PO Comp. % by mass | 25 | | 28.5 | 28.5 |
| Polyethylene (II) | | | | |
| PE2 | | | | |
| Mw | $5.6 \times 10^5$ | $7.5 \times 10^5$ | — | $7.5 \times 10^5$ |
| Mw/Mn | 4.1 | 11.9 | — | 11.9 |
| % by mass | 82 | 70 | — | 70 |
| P4 | | | | |
| Mw | $1.9 \times 10^6$ | $1.9 \times 10^6$ | — | $1.9 \times 10^6$ |
| Mw/Mn | 5.1 | 5.1 | — | 5.1 |
| % by mass | 18 | 30 | — | 18 |
| Conc. of PO Comp. % by mass | 25 | 30 | — | 25 |
| Total membrane composition | | | | |
| Layer structure | (I)/(II)/(I) | (II) | (I) | (II)/(I)/(II) |
| Layer thickness ratio | 40/20/40 | — | — | 33.5/33/33.5 |
| Low Tm Polymer | 20.0 | 0 | 0 | 0 |
| PE1 % by mass | 45.6 | 0 | 70 | 26.9 |
| PE2 % by mass | 16.4 | 70 | 0 | 47.0 |
| PE3 % by mass | 18.0 | 30 | 30 | 26.1 |
| Stretching of Gel-Like sheet | | | | |
| Temperature (° C.) | 115 | 118.5 | 114 | 114 |
| Magnification (MD × TD)[3] | 5 × 5 | 5 × 5 | 5 × 5 | 5 × 5 |
| Stretching of dried membrane | | | | |
| Temperature(° C.) | 121.2 | 127.5 | 128.0 | 125.0 |
| Magnification (TD) | 1.4 -> 1.2 | 1.4 | 1.2 | 1.3 -> 1.2 |
| Heat setting treatment | | | | |
| Temperature(° C.) | 121.2 | 127.5 | 128.0 | 125.0 |
| Time (sec) | 27 | 27 | 27 | 27 |
| Average thickness (μm) | 20.3 | 20.2 | 20.0 | 20.5 |
| Air Perm. (sec/100 cm³/20 μm) | 545 | 594 | 400 | 236 |
| Porosity % | 36.2 | 39.6 | 43.6 | 43.3 |
| Tensile strength MD/TD (kg/cm²) | 1105/1155 | 1780/1400 | 1590/1510 | 1190/1290 |
| Puncture Strength (mN/20 μm) | 4109 | 5680 | 5300 | 4320 |
| Heat shrinkage MD/TD (%) | 5.4/1.9 | 4.5/3.1 | 3.8/6.7 | 4.2/3.3 |
| Shutdown Temp. ° C. | 128 | 131.2 | 133.8 | 131.6 |
| Rupture Temp. ° C. | 152.6 | 150.7 | 150.1 | 149.0 |
| Storage stability (V) | — | 0.7 | 0.1 | 0.52 |
| Terminal unsaturation whole/$10^4$ C | 0.1 | 0.7 | 0.1 | 0.5 |
| Terminal unsaturation surface/$10^4$ C | 0.10 | 0.9 | 0.10 | 0.9 |
| Electrochemical Stability (mAh) | 57 | 145 | 54 | 230 |

The microporous membrane of Example 1 has a lower shutdown temperature than each of Comparative Examples 1-3. Likewise, Example 1 has a good balance of heat shrinkage and puncture strength. While not wishing to be held to any theory, it is believed that the presence of the low melting point polymer allows the skin layers to perform the shutdown function leaving the core layer to provide a good balance of the heat shrink and other mechanical properties. It is also believed that the ability to provide the shutdown function in the skin layers, particularly without sacrificing storage stability is desirable. Such a structure allows for faster shutdown speed because thermal transfer to the core layer is not necessary to initiate shutdown. Finally, because embodiments of the invention, e.g. Example 1, are able to employ skin layers including a polymer having a low terminal unsaturation content e.g., the polymer Comparative Example 3, it is believed that the storage stability can reasonably be expected to be very close to that of Comparative Example 3. Thus membranes such as Example 1 provide more desirable shutdown temperature, improved storage stability and/or more desirable pin puncture strength when compared to the Comparative Examples.

The invention is further described by the following embodiments. The invention is not limited to these embodiments.

1. A method for producing a microporous membrane, comprising,
    a. combining a first polymer composition comprising at least a first polymer having a Tm in the range of 115.0° C. to 130.0° C. and an Mw of from $5.0 \times 10^3$ to $4.0 \times 10^5$ and a first polyethylene having an Mw<$1 \times 10^6$ and an amount of terminal unsaturation<0.20 per 10,000 carbon atoms with at least a first diluent;
    b. combining a second polymer composition comprising at least a second polyethylene having an Mw<$1 \times 10^6$ with at least a second diluent;
    c. forming a multilayer extrudate having a first layer containing the first polymer composition, a second layer containing the second polymer composition; and
    d. removing at least a portion of the first and second diluents from the multilayer extrudate to produce the membrane.
2. The method of embodiment 1, further including combining a third polymer composition comprising at least a second polymer having a Tm in the range of 115.0° C. to 130.0° C. and an Mw of from $5.0 \times 10^3$ to $4.0 \times 10^5$, a third polyethylene having an Mw<$1 \times 10^6$ and an amount of terminal unsaturation<0.20 per 10,000 carbon atoms with at least one third diluent; and forming from the third polymer composition and third diluent a third layer comprising the third polymer composition.
3. The method of embodiment 1 or 2, further comprising stretching the extrudate before step (d) and removing at least a portion of any volatile species from the membrane during or after step (d).
4. The method of any of embodiments 1-3, wherein:
    (a) the amount of first polymer composition combined with the first diluent is in the range of about 15 to 35 wt. % and the amount of first diluent is in the range of 65 to 85 wt. %, both weight percents being based on the combined first polymer composition and first diluent; and
    (b) the amount of second polymer composition combined with second diluent is in the range of about 20 to 40 wt. % and the amount of second diluent is in the range of 60 to 80 wt. %, both weight percents being based on the combined second polymer composition and the second diluent.
5. The method of any of embodiments 1-4, wherein the multilayer extrudate further comprises at least one fourth polyethylene having an Mw≥$1 \times 10^6$.
6. The method of embodiment 5, wherein:
    the third polymer composition is the same polymer composition as the first polymer composition and the third diluent is the same as the first diluent;
    the first and third layers comprising 5 to 15 wt. % of the polymer having a Tm in the range of 115.0° C. to 130.0° C. and an Mw of from $5.0 \times 10^3$ to $4.0 \times 10^5$, 70 to 80 wt. % of the first diluent and 5 to 15 wt. % of the fourth polyethylene having an Mw≥$1 \times 10^6$, the third diluent being the same as the first and second diluents.
7. The method of embodiment 6, wherein the second layer also includes the fourth polyethylene, and the fourth polyethylene having an Mw≥$1 \times 10^6$ in the first and second layers is the same as the fourth polyethylene having an Mw≥$1 \times 10^6$ in the third layer.
8. The method of any of embodiments 1-7, further comprising cooling the multilayer extrudate following step (c).
9. The method of embodiment 8, further comprising stretching the membrane in at least one direction.
10. The method of embodiment 1, wherein the membrane stretching is conducted while the membrane is exposed to a temperature in the range of 90° C. to 135° C.
11. The method of embodiment 1, wherein the amount of terminal unsaturation is ≥0.20 per 10,000 carbon atom.
12. A multilayer membrane made by the method of any of embodiments 1-10.
13. A battery comprising an anode, a cathode, and at least one separator located between the anode and cathode, the separator comprising
    a first layer comprising at least a first polymer having a Tm in the range of 115.0° C. to 130.0° C. and an Mw of from $5.0 \times 10^3$ to $4.0 \times 10^5$ and a first polyethylene having an Mw<$1 \times 10^6$ and an amount of terminal unsaturation<0.20 per 10,000 carbon atoms;
    a second layer comprising a second polyethylene having an Mw<$1 \times 10^6$.
14. The battery of embodiment 13 further comprising a third layer comprising at least a second polymer having a Tm in the range of 115.0° C. to 130.0° C. and an Mw of from $5.0 \times 10^3$ to $4.0 \times 10^5$ and a third polyethylene having an Mw<$1 \times 10^6$ and an amount of terminal unsaturation<0.20 per 10,000 carbon atoms; wherein the second layer is located between the first and third layers.
15. The battery of embodiment 14, wherein the second polyethylene has an amount of terminal unsaturation<0.20 per 10,000 carbon atoms.
16. The battery of embodiment 16, wherein the second polyethylene has an amount of terminal unsaturation≥0.20 per 10,000 carbon atoms.
17. The battery of any of embodiments 13-15 and a load electrically connected thereto.
18. A multilayer microporous membrane comprising polymer and having a shutdown temperature of ≤130.5° C. and puncture strength of mN/20 μm.
19. The membrane according to embodiment 18, comprising:
    a. a first layer comprising 10 to 45 wt. % of a first polymer having a Tm in the range of 115.0° C. to 130.0° C. and an Mw of from $5.0 \times 10^3$ to $4.0 \times 10^5$, 55 to 90 wt. % of a polyethylene having an Mw of <1.0×10$^6$ and an amount of terminal unsaturation<0.20 per 10,000 carbon atoms;
b. a second layer comprising 70 to 98 wt. % of a polyethylene having an Mw<1×10$^6$ and 2 to 30 wt. % of a polyethylene having an Mw≥1.0×10$^6$; and
c. a third layer, the third layer comprising 10 to 45 wt. % of a second polymer having a Tm in the range of 115.0° C. to 130.0° C. and an Mw of from 5.0×10$^3$ to 4.0×10$^5$ and a 55 to 90 wt. % of a polyethylene having an Mw<1.0×10$^6$ and an amount of terminal unsaturation<0.20 per 10,000 carbon atoms the second layer being located between the first and third layers.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

Additionally, the term "comprising" is considered synonymous with the term "including" for the purposes of Australian law.

What is claimed is:

1. A multilayer microporous membrane comprising at least a first layer comprises a first polymer having a 115.0° C.≤Tm≤130.0° C. and an Mw of from 5.0×10$^3$ to 4.0×10$^5$ and a second layer comprising polyethylene having an amount of terminal unsaturation <0.20 per 10,000 carbon atoms, and having a shutdown temperature of ≤130.5° C. and a storage stability of 0.3V or less.

2. The membrane of claim 1, wherein the first polymer is a polyolefin having a 115.0° C.≤Tm≤130.0° C.

3. The membrane of claim 1, wherein the first layer includes a polyethylene having an Mw<1.0×10$^6$ and an amount of terminal unsaturation <0.20 per 10,000 carbon atoms.

4. The membrane of claim 1, further comprising at least a third layer comprising an ethylene/α-olefin copolymer having a Tm of ranging from 121.0 to 125.0° C. and a polyethylene having an Mw<1.0×10$^6$ and an amount of terminal unsaturation <0.20 per 10,000 carbon atoms; wherein the first polymer is an ethylene/α-olefin copolymer having a Tm of ranging from 121.0 to 125.0° C.; wherein the second layer is located between the first and third layers and further comprises a polyethylene having an Mw≥1.0×10$^6$.

5. The microporous membrane of claim 1, wherein the shutdown temperature is ≤128.5° C.

6. The microporous membrane of claim 1, wherein the storage stability is less than 0.2V and the membrane has a thickness greater than 18 μm.

7. The microporous membrane of claim 1, wherein the membrane has a normalized pin puncture strength greater than or equal to 3900 mN/20 μm and a normalized air permeability less than or equal to 300 seconds/100 cm$^3$/20μ.

8. The microporous membrane of claim 1, wherein the membrane's thickness is in the range of 20 microns to 25 microns, the normalized pin puncture strength is in the range of 3900 to 4300 mN/20 μm, the normalized air permeability is in the range of 200 to 300 seconds/100 cm$^3$/20 μm.

9. The microporous membrane of claim 1, wherein the membrane has a TD heat shrinkage at 105° C. in the range of 1% to 5% and an MD heat shrinkage in the range of 2% to 10%, a porosity in the range of about 30% to about 45%, an MD tensile strength of 1000 Kg/cm$^3$ or more, an TD tensile strength of 1000 Kg/cm$^3$ or more, and a meltdown temperature of 145° C. or more.

* * * * *